United States Patent
Zdarko et al.

(10) Patent No.: US 11,574,338 B2
(45) Date of Patent: *Feb. 7, 2023

(54) CONTROL SYSTEM BASED ON VIEWABLE ATTENTION

(71) Applicant: Quantcast Corporation, San Francisco, CA (US)

(72) Inventors: Seph Zdarko, San Carlos, CA (US); Ryan Lei Hin Chan, San Francisco, CA (US); David Alexander Grant, San Francisco, CA (US)

(73) Assignee: Quantcast Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,203

(22) Filed: Mar. 7, 2022

(65) Prior Publication Data

US 2022/0188860 A1     Jun. 16, 2022

Related U.S. Application Data

(63) Continuation of application No. 16/995,169, filed on Aug. 17, 2020, now Pat. No. 11,270,336, which is a continuation of application No. 15/083,146, filed on Mar. 28, 2016, now Pat. No. 10,748,179.

(51) Int. Cl.
*G06Q 30/02* (2012.01)

(52) U.S. Cl.
CPC ..... *G06Q 30/0249* (2013.01); *G06Q 30/0272* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 2011/0082755 A1* | 4/2011 | Itzhak | ................ | G06Q 30/0277 705/14.69 |
| 2015/0302467 A1* | 10/2015 | Marenko | ............ | G06Q 30/0275 705/14.46 |
| 2015/0348093 A1* | 12/2015 | Jiang | ................ | G06Q 30/0246 705/14.45 |

OTHER PUBLICATIONS

D. Scott Bagguley, "What is a Frequency Cap?", available on Apr. 7, 2015, retrieved from https://www.exactdrive.com/news/what-is-a-frequency-cap (Year: 2015).*

* cited by examiner

*Primary Examiner* — Sam Refai
(74) *Attorney, Agent, or Firm* — Andrea Wheeler

(57) ABSTRACT

Adaptive control of exposure. A proportional exposure cap is a maximum fraction applicable to a recipient's total viewable attention in a time window. The total viewable attention represents all viewable advertising content which will be provided to the recipient. A notification of availability of an opportunity to expose a specified recipient to advertising content is received during the time window. The specified recipient's consumed viewable attention is detected. The specified recipient's total viewable attention for the time window is predicted. Responsive to the maximum fraction of the specified recipient's predicted total viewable attention for the time window being greater than the consumed viewable attention of the specified recipient, content is sent to the specified recipient and the consumed viewable attention is updated.

33 Claims, 4 Drawing Sheets

CONTROL SYSTEM BASED ON VIEWABLE ATTENTION

CROSS-REFERENCE TO RELATED APPLICATIONS

This application is continuation of U.S. Non-Provisional application Ser. No. 16/995,169, entitled "Control System Based on Viewable Attention" by Seph Zdarko, Ryan Lei Hin Chan, and David Alexander Grant, filed on Aug. 17, 2020, which is a continuation of U.S. Non-Provisional application Ser. No. 15/083,146 entitled "Control System Based on Viewable Attention" by Seph Zdarko, Ryan Lei Hin Chan, and David Alexander Grant, filed on Mar. 28, 2016, now U.S. Pat. No. 10,748,179, issued Aug. 18, 2020, all of which are hereby incorporated by reference in their entirety.

BACKGROUND

Technical Field

This invention pertains to a control system for regulating the volume of advertising content delivered to a recipient.

Description of Related Art

Advertisers seek to increase awareness and sales of their goods and services through online advertising campaigns. Ideally, an advertiser may seek to repeatedly expose each recipient to advertising content, such as a banner ad displayed in conjunction with a web page on a browser, in order to make an impact. Once an optimal exposure level is achieved, the cost of additional exposures is not commensurate with an increase in the recipient's likelihood of conversion, resulting in an inefficient use of advertising budget. Furthermore, there is some evidence to indicate that overexposure to advertising content may harm sales or consumer opinion. Thus, when planning an advertising campaign, an advertiser may want to establish a maximum number of advertising exposures per recipient for a time window, such as the duration of the advertising campaign.

However, all recipients are not the same. For example, one recipient targeted by an advertiser may be a heavy online user who spends a significant amount of time online visiting a large number of different websites which support advertisements; an advertiser may have thousands of chances to purchase an opportunity to send advertising content to a recipient such as a heavy online user during a campaign. The heavy online user can expect to receive advertising content from a wide variety of advertisers. With a small, fixed exposure cap, one advertiser's advertising content may represent a tiny fraction of the total advertising content viewed by the heavy online user, and the advertiser's message may be dwarfed by the sheer volume of total advertising content. In contrast, a light online user may spend very little time online, and the websites the light online user visits may not all include advertisements. An advertiser may have very few chances to purchase an opportunity to send advertising content to a recipient such as a light online user during a campaign. A light online user may only receive advertising content from a small number of advertisers. The same small, fixed exposure cap which was applied to the heavy online user may represent a large fraction of the total advertising content viewed by the light online user, and the light online user may feel overexposed.

Furthermore, a fixed exposure cap which limits the number of times advertising content is sent to a recipient, but does not make a distinction between advertising content that could have been viewed by an end-user (e.g. advertising content rendered on a screen) and advertising content that could not have been viewed by an end-user (e.g. advertising content that was sent to a browser but never rendered on a screen). A measure of the viewability of advertising content can incorporate a measure of the degree to which the advertising content was displayed (e.g. area displayed, number of pixels displayed), the length of time the advertising content was displayed (e.g. 2 seconds on screen), or both. To illustrate the need for taking viewability into account when configuring an exposure cap, consider a case where advertising content is delivered to a browser, but never viewed by an end user operating the browser because the advertising content was positioned "below the fold" on a web page and the end user did not scroll down the viewed web page far enough to see the ad content. In another example, advertising content may be sent to a browser, but partially obscured by an item displayed on a monitor, such as a window. In another example, advertising content may be sent to a browser and fully displayed on the monitor, unobstructed, but may only be displayed for less than one second which may not have been long enough to influence the end user in any meaningful way, and may not meet minimum viewability requirements.

What is needed is a control system for adaptively controlling each recipient's maximum number of exposures to an advertiser's advertising content.

SUMMARY

Embodiments of the invention include a method, a non-transitory computer-readable storage medium and a system for adaptively controlling recipient exposure to an advertising campaign's advertising content. A proportional exposure cap applicable to a plurality of recipients of an online advertising campaign's advertising content is received. The proportional exposure cap comprises a maximum fraction applicable to a recipient's total viewable attention in the time window. A recipient's total viewable attention represents a measure of the viewable area and the exposure duration of all viewable advertising content (including viewable content which has been provided and will be provided) to the recipient in the time window, including viewable advertising content of a plurality of different online advertising campaigns. A notification of availability of an opportunity to expose a specified recipient to advertising content is received at a receipt time within the time window. The specified recipient's consumed viewable attention with respect to a portion of the time window preceding the receipt time is detected. The specified recipient's consumed viewable attention comprises a measure of viewable area and exposure duration of the online advertising campaign's advertising content provided to the specified recipient. The specified recipient's total viewable attention for the time window is predicted. Responsive to the maximum fraction of the specified recipient's predicted total viewable attention for the time window being greater than the consumed viewable attention of the specified recipient, the online advertising campaign's advertising content is sent to the specified recipient. The specified recipient's updated consumed viewable attention is detected with respect to a portion of the time window after the receipt time. Advantageously, an advertising campaign which adaptively controls maximum exposure levels proportional to the recipient's total viewable attention can be easily configured and operated with a single proportional frequency cap which can be applied to a plurality of recipients with different advertising exposure patterns. As a result, the maximum number of times advertising content should be sent to a recipient is tailored to each recipient based on the recipient's respective predicted total viewable attention. Because the predicted total viewable attention for a recipient can change throughout an advertising campaign, the maximum number of times advertising content may be sent to the recipient can also change during the operation of an advertising campaign. This novel control system automatically scales an advertising campaign's delivery of advertising content to a wide variety of recipients who may have very different histories of advertising exposure (e.g. a heavy Internet user who primarily visits advertising-funded websites compared to a light Internet user who primarily visits premium advertising-free websites) as well as recipients with bursty or changing advertising content exposure patterns; advantageously, operating an advertising campaign according to the adaptive control method results in a an exposure cap (representing the maximum number of exposures to the advertising campaign's advertising content) which can change and adapt for each individual recipient during an advertising campaign without requiring reconfiguration. Importantly, because only viewable advertising content is expected to have an impact on the recipient, the consumed viewable attention and the predicted total viewable attention are determined based on viewable attention, which can account for both the viewable area and the exposure duration of advertising content sent to the recipients and excludes contributions from advertising content which is deemed unlikely to have an impact on the end user, such as advertising content which does not meet minimum viewability standards (e.g. minimum area exposed, minimum exposure duration, etc.).

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention provide a method, a non-transitory computer-readable storage medium and a system for adaptively controlling recipient exposure to an advertising campaign's advertising content. Advantageously, the maximum number of times an advertiser's advertising content can be sent to a specified recipient is adaptively controlled based on the specified recipient's history of viewable advertising content exposure, including both the consumed viewable attention (a measure of viewable area and exposure duration of the advertising campaign's advertising content provided to the specified recipient) and the predicted total viewable attention (which includes a prediction of the viewable area and exposure duration of all advertising content which will be provided to the specified recipient during the time window). This novel control system overcomes the disadvantages of a fixed exposure cap (e.g. a fixed number of exposures per recipient), which may not suit a plurality of recipients with differing browsing behaviors. Furthermore, an individual recipient's predicted total viewable attention may fluctuate significantly over time, and the adaptive control system can dynamically adapt to such fluctuations, avoiding underexposure for recipients having low predicted total viewable attention early in a time window and high predicted total viewable attention late in a time window. Incorporating the concept of total viewable attention into the proportional exposure cap is especially important because it takes into account viewable advertising content exposure which is related to the individual recipient's browsing style (e.g. visitation to ad-free websites vs. visitation to ad-sponsored websites, scrolling behavior, windowing behavior, web page residence time). Configuration is simplified through the use of a proportional exposure cap which is applicable to a plurality of recipients of the online advertising campaign's advertising content.

Embodiments of the invention are described below in the context of a real-time bidding advertisement exchange for opportunities to display advertisements to users through their web browsers. It is noted that similar techniques as those described below can be used in targeting advertisements in the context of other kinds of auctions and advertisement exchange systems, for use with browser-based advertisements or other types of networked media as well. Such techniques are particularly useful where rapid decisions regarding advertisement opportunities are desirable.

Figure 1:
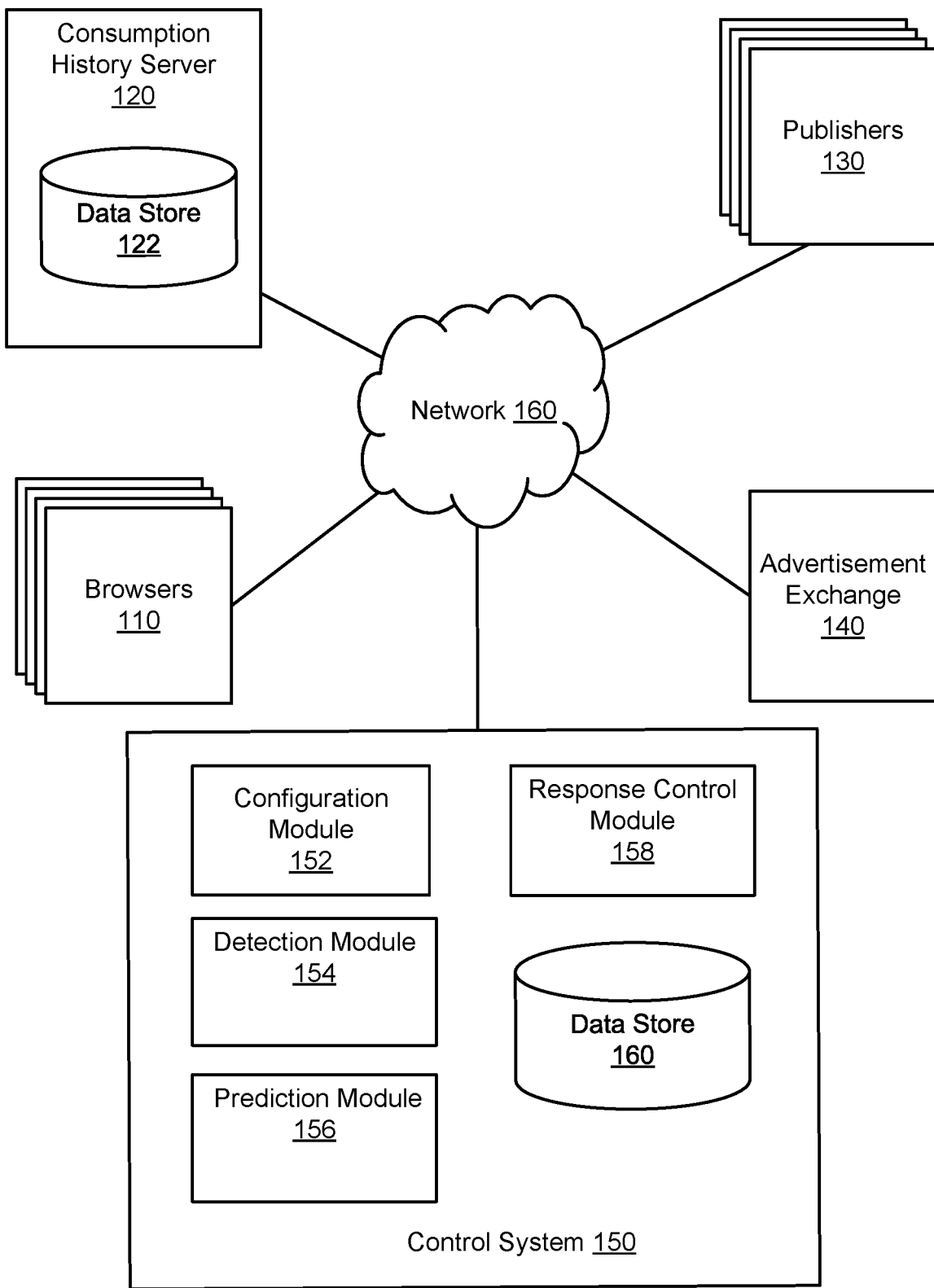
FIG. 1 is a high-level block diagram of a computing environment for an adaptive control system, in accordance with an embodiment of the invention.

FIG. 1 is a high-level block diagram of a computing environment for an adaptive control system 160, in accordance with an embodiment of the invention. The computing environment includes users' browsers 110, a consumption history server 120, publishers 130, an advertisement exchange 140, and a control system 150. These elements are connected by a communication network 160, such as a local area network, a wide area network, a wireless network, an intranet, a cable network, a satellite network, a cellular phone network, an optical network, the Internet or combinations thereof.

A recipient can be an application such as a user's browser. A browser can be a web browser executing on a user device, such as a desktop computer or a mobile phone, as the users of those devices browse the web. As users undertake their normal web browsing activities using the browsers 110, in one embodiment, data for some events, such as media consumption events (e.g. web page views, exposures to advertising content), is reported to the consumption history server 120. The data enables the consumption history server 120 to record events in a data store 122 in conjunction with an anonymous identifier, such as a cookie value, and a timestamp. The received data may also enable the consumption history server 120 to record other data about the browser 110, the operating system that operates the browser 110 as well as other characteristics of the system that operates the browser (e.g., screen resolution).

A recipient can represent a networked consumer and can be a device (e.g. a mobile device, wearable device or a desktop computer) or an application (e.g. a cell phone game, cell phone application). For example, an application can be executed on a user device, such as a personal computer, laptop computer, tablet computer, smartphone, a specialized hardware gaming device and a wearable device. In one embodiment, as users undertake their normal activities using applications, devices or both, data for some events, such as media consumption events, interactions with an application, status events, and advertising content exposures is reported to the consumption history server 120. The data enables the consumption history server 120 to record events in a data store 122 in conjunction with a recipient's anonymous identifier, such as a device identifier, application identifier or both. The received data may also enable the consumption history server 120 to record other data about the recipient, such as the operating system operating on the device, characteristics of the recipient (e.g., screen resolution, application version, patch level) and a device or application status (e.g. points accumulated playing a cell phone game, battery charging status).

When data describing events is reported to a consumption history server 120, each reported event is associated with an identifier to enable the consumption history server 120 to properly assign the event to the recipient related to the event. Examples of recipients can include end users, customers, software installations or hardware devices used to access content over a network or combinations thereof. Software installations can include a web browser instance, video viewer instance or set-top box software residing on a hardware device. A hardware device can comprise a computer, personal digital assistant (PDA), cell phone, a networked gaming device, an augmented reality (AR) system or set-top unit (STU) such as a STU used in conjunction with cable television service. In some cases, a recipient represents an individual person, and in other cases a recipient represents a combination of individuals which are logically grouped together, such as but not limited to a family, a household, a social network, a business, a department, or a team.

Recipients, such as browsers 110 which receive content, such as a web page or advertising content, from a publisher 130, such as a mobile website, can also be called a visitor to that publisher (e.g. a website visitor). A publisher 130 sends content to a recipient, such as a browser 110, over a network. In some cases, content may be streamed from a publisher 130 to a recipient such as a browser 110. A web page, advertising content, audio content, video content, multimedia content, and downloadable software are examples of content. A browser 110 can receive content, from a publisher 130 or a proxy of the publisher 130.

A variety of methods exist for associating an anonymous identifier with a recipient. For example, a hardware device identifier such as a Media Access Control Address (MAC address), an International Mobile Station Equipment Identity (IMEI), a Mobile Equipment Identifier (MEID), or an Electronic Serial Number (ESN) can be stored on a device operated by a user to access content over a network. As another example, a software identifier such as a cookie value, an application identifier, an application installation identifier, or an operating system identifier such as an Android_ID or Unique Device ID (UDID) can be locally stored. In other embodiments, identifiers can be composed and/or stored remotely from a device associated with a recipient. In some cases, a recipient, such as a browser, can have multiple identifiers, such as multiple first party cookies and multiple third party cookies, which can be used to identify the browser to various systems.

The advertisement exchange 140 is a technology platform that facilitates the selling and buying of opportunities to expose recipients to advertising content, referred to as advertising slots. Publishers 130 offer advertising slots for sale through an advertisement exchange 140. Some advertisement exchanges operate as an auction where advertisers can submit bids to buy advertising slots in real-time. In such cases, the advertisement exchange sends notifications to potential bidders. Each notification can indicate the availability of an opportunity to expose a specified recipient to advertising content. A notification may include several characteristics that may influence an immediate decision about if and how much an advertiser is willing to bid for the privilege of sending advertising content to a specified recipient. For example, the notification may include information identifying the publisher (e.g. a mobile application or website) having the available opportunity, the topic of the webpage having the available opportunity, the dimensions of the available slot, and an identifier that can be used by the potential bidder to look up or cross-reference related information about the specified recipient, such as the specified recipient's frequency on the site and/or other data in the specified recipient's history. The notification may comprise a request for a bid price for the given opportunity, a request for advertising content or both. A bid request, which is an invitation for a bidder to submit a bid price for the opportunity to expose a specified recipient to advertising content, is an example of a notification that can be sent to a bidder. As illustrated in FIG. 1, the advertisement exchange 140 communicates, either directly or indirectly, with a bidder such as an advertising campaign operations system or a control system 150. In an embodiment, response control module 178 of the control system 150 may operate as a bidding module, receiving notifications from advertisement exchange 140 and sending responses to the notifications (i.e. bid responses in response to a bid request) to advertisement exchange 140. A bid response may comprise a bid price, advertising content, directions for acquiring advertising content, advertising content customization instructions, or combinations thereof.

Control system 150 comprises a configuration module 152, a detection module 154, a prediction module 156 module, a response control module 158 and a data store 160. In FIG. 1, consumption history server 120 is illustrated as external to control system 150. However, in an embodiment, consumption history server 120 may be internal to control system 150.

Configuration module 152 receives a proportional exposure cap applicable to a plurality of recipients of an advertising campaign's advertising content. The maximum number of times a specified recipient will be sent advertising content of the advertising campaign is proportional to the specified recipient's total viewable attention in a time window. The proportional exposure cap comprises a maximum fraction or percentage of a recipient's total viewable attention in a time window.

A recipient's total viewable attention is a measure of viewable area and exposure duration of all viewable advertising content which will be provided to the recipient in a time window. A time window may represent the duration of an advertising campaign or portion thereof. During a time window, a heavy internet user who visits many different advertising-sponsored websites will be sent a larger number of items of advertising content than a light Internet user who visits only a few premium, advertising-free websites. A recipient may receive multiple items of advertising content associated with many different advertising campaigns in the context of a plurality of different publishers during a time window. For example, during a time window, a recipient may browse a plurality of different websites; in conjunction with each website visit, the recipient may receive multiple items of advertising content (e.g. banner ads, video ads, pop-up ads), and be exposed to advertising content associated with a variety of different advertisers and products. Importantly, a recipient's total viewable attention reflects that recipient's total viewable exposure to advertising content for the time window, and takes into account the viewability (e.g. area of advertising content exposed, duration of advertising content exposure or both) of multiple items of advertising content sent to the recipient.

In an example, an amount of viewable attention can be determined for each item of advertising content sent to a recipient. A recipient's total viewable attention can be predicted by summing the amounts of viewable attention associated with items of advertising content sent to a recipient during the portion of the time window which has already elapsed and estimating the viewable attention associated with items of advertising content which will be sent to the recipient during the remainder of the time window. In an example, a recipient's total viewable attention may exclude contributions from advertising content which is deemed unlikely to have an impact on the end user, such as advertising content which does not meet minimum viewability standards (e.g. minimum area exposed, minimum exposure duration, etc.).

In some embodiments, the amount of viewable attention associated with a single item of advertising content sent to a recipient can be subject to a duration cap. For example, a measure of viewable attention may increase with exposure duration for an individual advertising content exposure of up to a duration cap (e.g. two minutes), and then not increase for that individual advertising content exposures once the duration cap has been surpassed. In some cases, the amount of viewable attention associated with a single item of advertising content sent to a recipient can be subject to a minimum exposure duration (e.g. thirty seconds). For example, a measure of viewable attention may be set to zero until the item of advertising content has been viewable for at least the minimum exposure duration, and then increase with exposure duration for advertising content exposures, possibly subject to a duration cap.

In some embodiments, the area of advertising content exposed may be measured in terms of an area (e.g. square inches), a number of pixels (e.g. 300×250 pixels or 75,000 pixels), the relative proportion of a display screen (e.g. 10% of screen real estate), or combinations thereof. In an example, viewable attention and total viewable attention can be measured in terms of area multiplied by time. For example, viewable attention and total viewable attention can be expressed in units of square inch-minutes, a number of pixels multiplied by time (e.g. pixel-minutes), or a time (e.g. 10% of a display or window viewable for 60 seconds would result in 6 seconds of viewable attention).

In some embodiments, viewable attention and total viewable attention can take into account other aspects of viewability in addition to or instead of area of advertising content exposed and duration of advertising content exposed. For example, in some cases, a determination of viewable attention and total viewable attention can take into account interactions with advertising content. For example, an interaction with advertising content can be deemed an indication that the advertising content was viewed by an end user; in this case, if an interaction with advertising content is detected with respect to a particular advertising content exposure, the area of advertising content may be set to the maximum viewable area for that exposure. Examples of interactions include scrolling, clicking, hovering with a mouse, and manipulating audio or video content through fast forwarding, rewinding, pausing, etc. In an example, hardware configuration, software configuration or both may be aspects of viewability. For example, advertising content which includes an audio component may only be considered viewable if minimum criteria related to audio delivery are met by the recipient such as a minimum hardware volume setting, a minimum software volume setting, the presence of a required installation of software such as an audio player plug-in, or combinations thereof.

A recipient's total viewable attention in a time window represents the viewable attention of all of the advertising content which will be sent to the recipient in the time window (including advertising content which has already been sent); this can include advertising content associated with a plurality of different advertisers, advertising content received in the context of a plurality of different publishers or combinations thereof. Advertising slots may be purchased directly from a publisher (e.g. premium advertising slots), through one or more different advertisement exchanges or advertising networks, or combinations thereof. Accordingly, a recipient's total viewable attention can represent advertising content which was acquired by or on behalf of an advertiser through a plurality of different sources (e.g. multiple different exchanges, a combination of exchanges and publishers, multiple different publishers).

Advantageously, the maximum number of times a specified recipient will be sent advertising content of the advertising campaign in a time window adapts to the specified recipient's total viewable attention in the time window. Each recipient of the advertiser's advertising content may receive a customized volume of advertising content of the advertiser based on their history of receiving viewable advertising content from a plurality of advertisers in the context of a plurality of publishers. A recipient's viewable attention accumulates during the time window and a recipient's predicted total viewable attention can change during the time window. Typically, a recipient's accumulation of viewable attention does not occur at a constant rate throughout the time window. For example, a recipient may have periods of intense browsing of advertising supported websites (resulting in a rapid accumulation of viewable attention), periods of low browsing activity of premium ad-free websites (resulting in a slow accumulation of viewable attention) and periods of inactivity. Because a recipient's predicted total viewable attention in a time window can change throughout the time window, the proportional exposure cap (which is a maximum fraction applicable to a recipient's total viewable attention in the time window) translates into a maximum number of times advertising content of the advertiser can be sent to the recipient which can change during the time window; the maximum number of times advertising content of the advertiser can be sent to the recipient can adapt dynamically as the recipient's changing browsing behaviors result in viewable exposures to advertising content from a variety of advertisers.

Detection module 154 receives viewability information and determines the consumed viewable attention of recipients of the advertising campaign's advertising content with respect to a portion of a time window. The consumed viewable attention of a specified recipient of the advertising campaign's advertising content comprises a measured, estimated or inferred viewable area and exposure duration for all of the advertising campaign's advertising content provided to the specified recipient during a portion of the time window. In some cases, the viewability information can comprise information associated with end-user interaction with advertising content (e.g. mouse over, click through). In some cases, user interaction with advertising content may be detected using information collected from a hardware device or hardware component associated with the recipient. The detection module 154 can determine the consumed viewable attention of a recipient responsive to a request (e.g. a request for the consumed viewable attention of a specified recipient from the response control module 156) or responsive to receiving updated information (e.g. from a specified recipient or a viewability system). In some cases, the detection module 154 may receive information, such as a notification that a recipient has changed their media consumption behavior, and update the recipient's consumed viewable attention responsive to the notification of changed behavior. Examples of changes are: an increase or decrease in the number of web sites visited a day by the recipient, an increase or decrease in the recipient's average residence time per web page, and increase or decrease in the number of opportunities to expose the recipient to advertising content per day, or combinations thereof. For example, a change in a recipient's media consumption behavior may be detected by the control system 150, a consumption history server 120, or the recipient 110.

In an example, a recipient (e.g. browser 110) or a system, such as a viewability system (not shown), can determine viewability information, such as the consumed viewable attention associated with an individual item of advertising content sent to a specified recipient, and send this viewability information to the control system 150 in conjunction with an identifier associated with the specified recipient. In an example, the viewability information can further comprise a time stamp indicating when the individual item of advertising content was sent to the specified recipient. With this information, the detection module 154 can detect, with respect to a portion of a time window, a consumed viewable attention of the specified recipient with respect to the advertising campaign's advertising content sent to the specified recipient. In an example, the consumed viewable attention in a time window (e.g. the time window of a campaign) preceding the receipt time of a notification can be estimated by scaling a measure of the specified recipient's consumed viewable attention of just a portion of the time window preceding the receipt time.

A variety of techniques for detecting viewability information are known in the art such as resource-based viewability techniques and geometric techniques. In an example, the advertising campaign's advertising content can be instrumented with software which can operate at the recipient to detect the viewability (e.g. measure viewable area, measure exposure duration, detect end-user interaction with the advertising content) of advertising content rendered on a device and send viewability information to a viewability system, the control system 150 or both. For example, instructions can be embedded in advertising content sent to a recipient (e.g. browser 110), such as instructions for requesting and running a Java script which detects viewability information of advertising content that is rendered in a browser 110 and sends the viewability information to the control system 150. Advertising content can be instrumented by embedding the Java script's tag in advertising content that will be rendered in a browser 110. In an example, the viewability of advertising content can be inferred by instrumenting an ad container (such as an I-frame) to detect and report on the viewability of advertising content rendered in the ad container. In an example, the viewability of advertising content may be determined or inferred using information received from a hardware device or hardware component associated with the recipient.

Prediction module 156 predicts the total viewable attention for a specified recipient for a time window, such as the duration of an advertising campaign or a portion thereof. A recipient's total viewable attention represents a measure of the viewable area and the exposure duration of all viewable advertising content which will be provided to the recipient in the time window, including viewable advertising content of a plurality of different online advertising campaigns. In an example, the prediction module 156 may use a model to predict the total viewable attention of a specified recipient. For example, the prediction module 156 may receive information about a specified recipient, such as a media consumption history from consumption history server 120 and predict the total viewable attention of the specified recipient from the received media consumption history. In an example, media consumption histories, including advertising content viewability information and website visitation histories, may be collected for a panel of browsers (i.e. panelists). A model may be developed which correlates a panelist's total viewable attention with the panelist's website visitation history (e.g. websites visited, website visit frequency, website residency times), the panelist's history of interactions (e.g. advertising content click through, scrolling behavior), information related to the panelist (e.g. browser version, hardware configuration, software configuration, geographic region) or combinations thereof. The model may be applied to the received media consumption history of a specified recipient to predict the total viewable attention of the specified recipient for a time window, wherein at least some portion of the time window is a future time span.

In an example, a model to predict a specified recipient's total viewable attention may be developed without the use of a panel. For example, a website operator can estimate or determine the website audience's total viewable attention (i.e. the total viewable attention of each visitor to the website summed together) and unique audience size (i.e. number of unique visitors in the website's audience) for a time period (e.g. a month). The control system 150 can receive website level information (e.g. the website audience's total viewable attention and number of unique visitors in the website's audience for a time period) from a plurality of websites and estimate a specified recipient's total viewable attention for a campaign's time window using the website level information and the specified recipient's website visitation history (e.g. list of websites visited, residency time per website visited).

In an example, a specified recipient's total viewable attention can be inferred from a media consumption history. For example, a consumption history server 120 can receive a specified recipient's browsing history. The control system 150 may estimate that the consumption history collected by the consumption history server 120 represents one fourth of the browsing history of each recipient. A recipient's viewable attention for all advertising content over a time period (e.g. a day) as measured by the consumption history server 120 may be determined, and then scaled to estimate the total viewable attention for the duration of an advertising campaign (e.g. multiply by 4 to scale for the fraction of the browsing history which was not collected by the consumption history server and multiply by 30 to account for a 30 day advertising campaign).

Response control module 158 receives notifications and determines responses to the notifications based on received and detected information (e.g. a proportional exposure cap from the configuration module 152, a consumed viewable attention from detection module 154, a total viewable attention from prediction module 156). The response control module 158 receives a notification indicating that an opportunity to expose a specified recipient to advertising content is available at a time within the advertising campaign's time window. For example, the notification can be a bid request from an advertisement exchange 140 or a notification from a publisher 130. The response control module determines if the proportional exposure cap has been satisfied for the advertising campaign's time window. A proportional exposure cap has been satisfied for a time window if the maximum fraction of the specified recipient's total viewable attention is less than or equal to the specified recipient's consumed viewable attention in the time window preceding the receipt time. Responsive to determining that the proportional exposure cap is not satisfied for the advertising campaign's time window, the response control module 158 generates a response to the notification. A response to a notification can comprise a bid price, advertising content, customized advertising content, instructions for acquiring advertising content, advertising content customization instructions, or combinations thereof. The response control module 158 can send the generated response to one or more systems such as an advertisement exchange 140, a recipient such as a browser 110, a publisher 130 or combinations thereof.

In some cases, an absolute frequency cap (e.g. 50 exposures/recipient) limiting the absolute number of times advertising content may be sent to an individual recipient in the course of an advertising campaign may be implemented in conjunction with the proportional exposure cap; in this case, response control module 158 determines if both the proportional exposure cap and the absolute frequency cap have been satisfied and, responsive to the determining that both the proportional exposure cap and the absolute frequency cap have been satisfied, response control module 158 can generate a response and send the generated response to one or more systems such as an advertisement exchange 140, a recipient such as a browser 110 and a publisher 130 or combinations thereof.

Determining if a proportional exposure cap for a time window has been satisfied for a specified recipient requires comparing the maximum fraction of the specified recipient's total viewable attention for the time window to the specified recipient's consumed viewable attention at a point in the time window. Importantly, the prediction module 156 can be operated to predict the total viewable attention for a time window for a specified recipient multiple times during a time window. In an example, the prediction module's initial predictions of total viewable attention can be too high early in a time window, but adjust downwards later in the time window. For example, a recipient may rapidly accumulate viewable attention early in a time window, but accumulate very slowly later in the time window. In an embodiment, the prediction module may predict a very high total viewable attention for the whole time window based on the information available early in the time window, but later predictions by the prediction module may take into account the slowed accumulation of viewable attention and adjust the estimated total viewable attention to a lower value. In this case, the control system may determine that the proportional exposure cap has not been satisfied early in the time window, but later determine that the proportional exposure cap has been exceeded later in the time window. Similarly, the prediction module's initial predictions of total viewable attention can be too low for a recipient having a very slow accumulation of viewable attention early in a time window, but the total viewable attention can be adjusted if the recipient's viewable attention accumulates rapidly later in the time window. In this case, the control system may determine that the proportional exposure cap has been satisfied early in the time window, but determine that the proportional exposure cap has not been satisfied at a time later in the time window.

For clarity, FIG. 1 has illustrated only one instance of an advertisement exchange 140. In practice, a control system 150 may receive notifications from a plurality of different advertisement exchanges.

Figure 2:
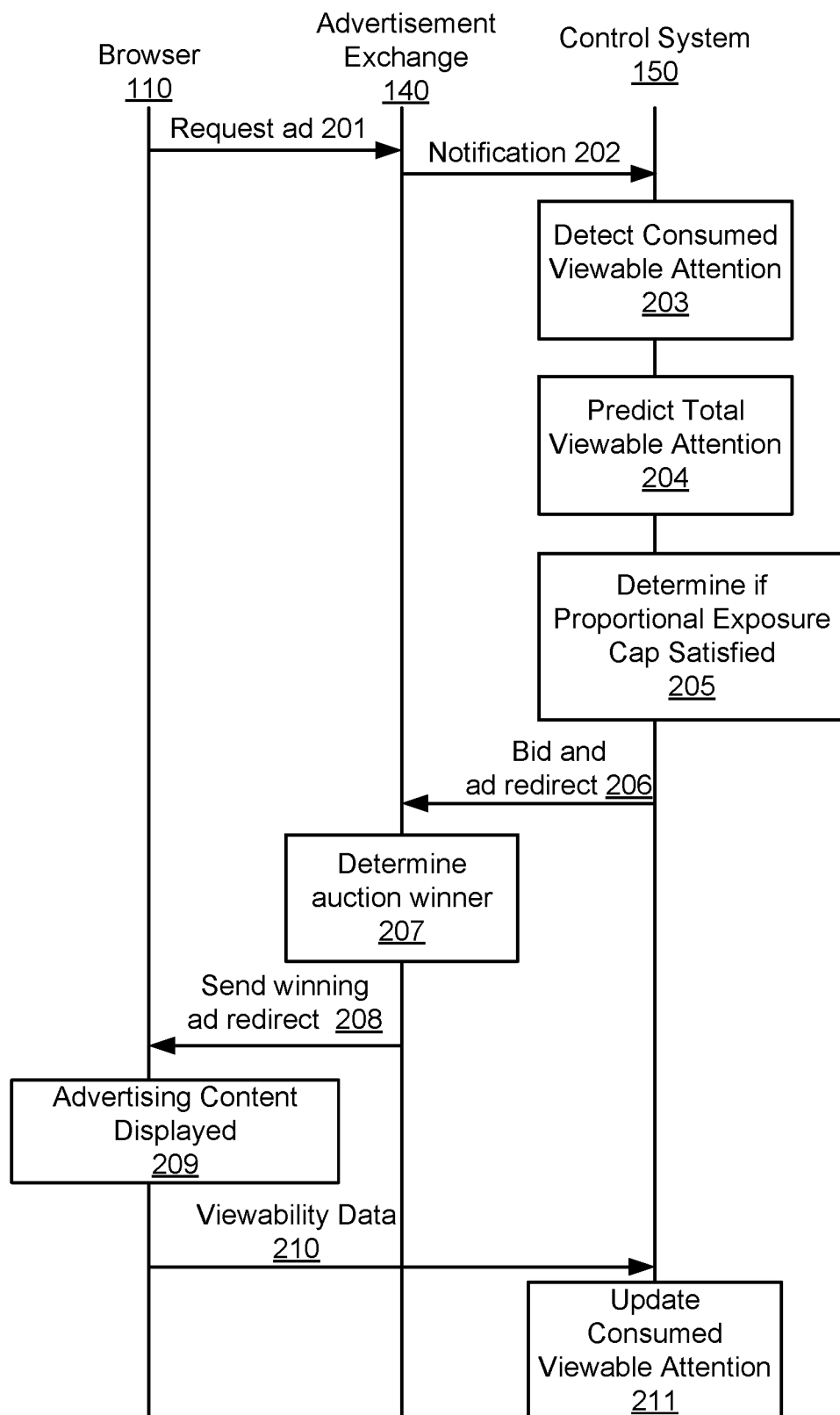
FIG. 2 is an interaction diagram illustrating adaptive control, in accordance with an embodiment of the invention.

FIG. 2 is an interaction diagram illustrating adaptive control, in accordance with an embodiment of the invention. It is noted that FIG. 2 is merely illustrating an example of a real-time bidding environment, and the interactions depicted in FIG. 2 may vary in other examples.

In the scenario illustrated in FIG. 2, the recipient of the advertising content is a browser 110. As a user operates browser 110 and navigates to a publisher's website that includes an advertising slot to be auctioned in an advertisement exchange 140, the publisher's web server sends instructions to the browser 110 for accessing content to be displayed on the website, including a coded link known as an "ad tag" that points to an advertisement exchange 140. The browser 110 uses the ad tag to contact the advertisement exchange 140 with a request for advertising content (request ad) in step 201.

The advertisement exchange 140 receives the request for the advertising content from the browser 110 and reads the identifier. In response, the advertisement exchange starts the auction by sending a notification 202, which in this case is a bid request, to the control system 150 and to other servers to notify potential bidders of the bidding opportunity. Included with the bid request is an identifier and other data describing the bid opportunity, such as, for example, the URL on which the advertising content will be delivered, the topic of the webpage on which the advertising content will appear, site visit frequency, and/or the dimensions of the advertising slot.

The control system 150 receives the notification 202, and may match the identifier delivered from the advertisement exchange 140 to a recipient's corresponding identifier that is linked to a rich set of data, such as the consumption history. In one embodiment, to access the consumption history, the control system 150 requests it from the consumption history server 120.

In step 203, control system 150 detects the consumed viewable attention of the recipient associated with the corresponding identifier for the advertising campaign at a time in the time window. The consumed viewable attention at a point in time is a measure or estimate of the viewable area and exposure duration of the advertising campaign's advertising content sent to the recipient in the time window up to that point in time. In an example, the consumed viewable attention in the time window (e.g. the time window of a campaign) preceding the receipt time of a notification can be estimated by scaling a measure of the specified recipient's consumed viewable attention of just a portion of the time window preceding the receipt time. Depending on the implementation of the control system 150, the consumed viewable attention of the recipient can be estimated or determined based on historic viewability information. In some cases, the viewability information may be received from the consumption history server 120.

In step 204, control system 150 predicts the total viewable attention of the recipient for the time window (e.g. duration of the advertising campaign). A recipient's total viewable attention reflects the viewable area and exposure duration of all advertising content which has been received and which will be received by the recipient during the time window.

In step 205, control system 150 determines if the proportional exposure cap has been satisfied. In an example, the control system 150 operates an advertising campaign on behalf of an advertiser. The advertising campaign is configured with a proportional exposure cap for a time window, such as the duration of an advertising campaign. The proportional exposure cap comprises a maximum fraction which is applicable to a recipient's total viewable attention. The proportional exposure cap is satisfied for a specified recipient if the maximum fraction the specified recipient's predicted total viewable attention for the time window is less than or equal to the specified recipient's consumed viewable attention at a time in the time window. The control system 150 determines if the maximum fraction of recipient's predicted total viewable attention is greater than the recipient's consumed viewable attention, which indicates that the proportional exposure cap is not satisfied. Responsive to the determining that the proportional exposure cap has not been satisfied, the control system generates a response to the notification 202. In some cases, additional considerations may be applied before the response to the notification is generated, before the response is sent or both. For example, the control system 150 may receive pacing limitations and apply the pacing limitations in addition to the proportional exposure cap to determine if it is appropriate to generate and/or send a response. By applying a pacing limitation, an advertiser can spread out a recipient's exposure to their advertising content over time (e.g. across a time window, over the duration of the campaign, per hour, per day). A pacing limitation can comprise an upper limit to the number of items of an advertiser's advertising content which can be sent to a recipient per unit time (e.g. an advertiser's advertising content cannot be sent to the same recipient more than 5 times in an hour), an upper limit to the consumed viewable attention per recipient per unit time (e.g. once a recipient's consumed viewable attention reaches an upper limit in a day, prevent the control system from sending the advertiser's advertising content to that recipient until the next day) or both. In another example, a pacing limitation can be used to limit the number of times an advertiser's advertising content is displayed through the same website (e.g. an advertiser's advertising content cannot be sent to the same recipient more than 5 times in an hour in the context of the same web page).

A response 206 comprising a bid price and ad redirect is sent to the advertisement exchange 140. An ad redirect provides instructions for directing the browser to a server that will serve the advertising content for the advertising campaign should the control system 150 win the auction.

In step 207, advertisement exchange 140 determines an auction winner from the submitted bids. In some implementations, the advertisement exchange 140 may send a second notification to the winner and/or the other bidders. The second notification may include an indication of whether the bidder won the auction, and may confirm the amount that the winner will be charged for buying the ad placement, which is some cases is the amount of the second highest bid.

In step 208, the advertisement exchange 140 sends the ad redirect included with the winning bid to the browser 110. The browser 110 uses the ad redirect to access the advertising content so that the browser can display the advertising content in step 209.

In step 210, viewability information is sent from the browser 110. Viewability information can comprise a measure or estimate of the viewable area of the advertising content displayed on the browser and a measure or estimate of the exposure duration of the advertising content. In this example, the viewability information is sent to the control system 150. In an embodiment, viewability information can be sent to another system in addition to the control system 150 or instead of the control system 150, such as the consumption history server 120, which can store the information in data store 122.

In step 211, the consumed viewable attention of the recipient is updated to include viewability information sent in step 210.

In some implementations, the process illustrated in steps 201 through 210 of FIG. 2 can be executed in a few seconds. Ideally, the time passage between the browser 110 requesting the advertising content in step 201 and the display of the advertising content in step 209 is short enough not to impact the user's enjoyment of the publisher's website that the user is browsing. In other words, there is no noticeable lag to download and display the appropriate advertising content of the winning bidder in the auction.

Although the interaction diagram of FIG. 2 illustrates the operation of an embodiment of the adaptive control system 150 in a real-time bidding environment. However, in an embodiment, some publishers may sell some or all of their advertising slots without going through an advertisement exchange. In this case, instead of inter-operating with the advertising exchange 140, the browser 110 may request advertising content in step 201 from the publisher or send a notification (i.e. the request for advertising content) directly to the control system 150. Depending on the configuration, the control system 150 can send the response to the publisher or directly to the browser 110. In this case, the response can comprise the advertising content, instructions for accessing advertising content, advertising content customization instructions or combinations thereof.

Figure 3:
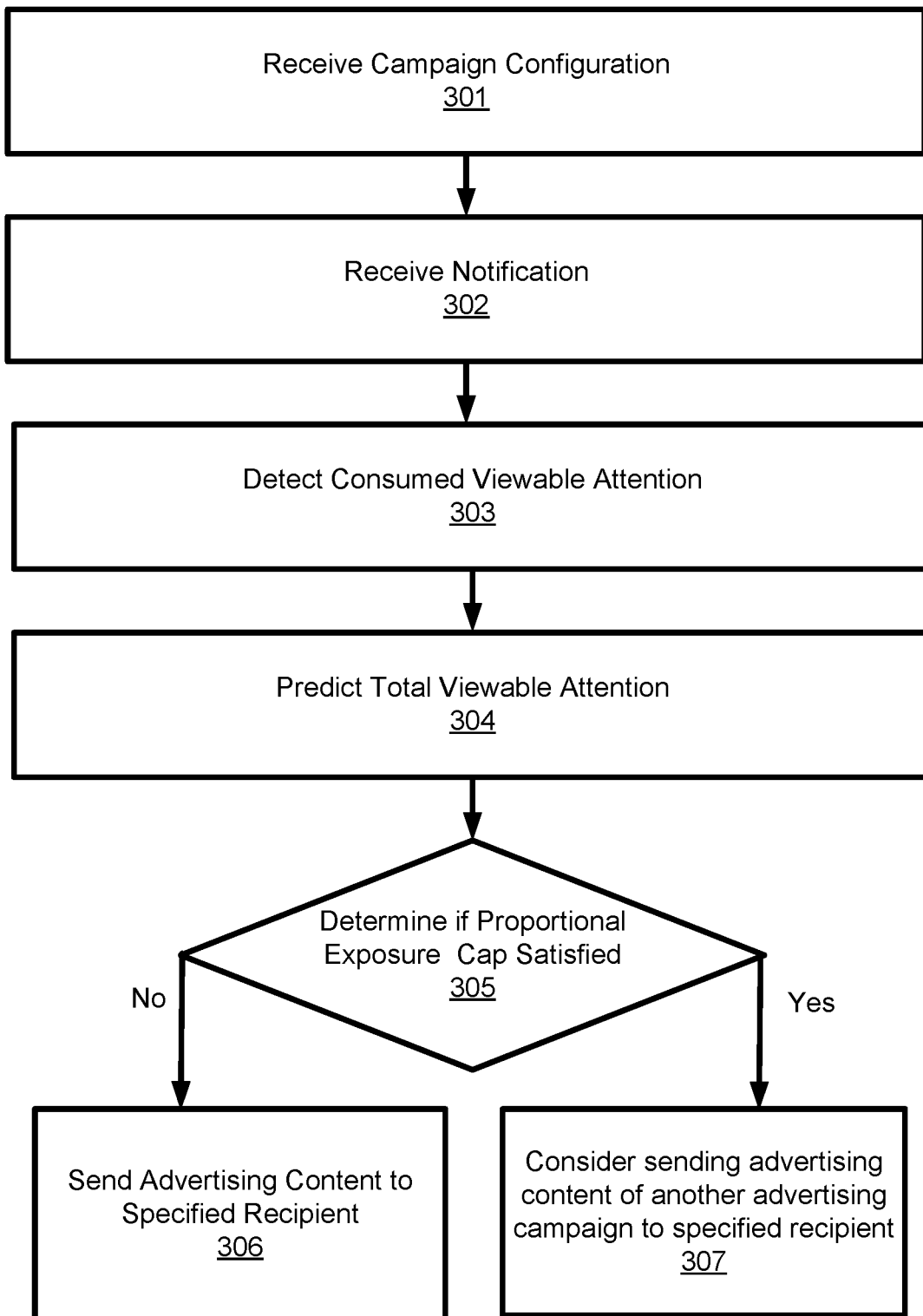
FIG. 3 is a flow chart illustrating a method of adaptive control, in accordance with an embodiment of the invention.

FIG. 3 is a flow chart illustrating a method of adaptive control, in accordance with an embodiment of the invention. In some implementations, the steps are performed in an order other than the order presented in FIG. 3, and in other implementations, additional or alternative steps may be performed.

In step 301, a campaign configuration is received by the control system 150. The campaign configuration comprises a proportional exposure cap. The campaign configuration can comprise additional information for operating an advertising campaign on behalf of an advertiser such as a time window for the campaign, a budget for the campaign, recipient targeting information, a campaign budget, or combinations thereof.

In step 302, a notification is received by the control system 150. In an embodiment, the notification can comprise a bid request sent from an advertisement exchange 140, a notification of the availability if an opportunity to expose a specified recipient to advertising content from a publisher 130. The notification is received at a receipt time within a time window, such as the time window during which the advertising campaign operates. In an example, the notification is received at the control system 150 after a recipient such as browser 110 requests content from a publisher 140 (e.g. after a browser requests a web page from a web site), after a recipient such as browser 110 requests advertising content (e.g. after a browser operates instructions provided by a website for requesting advertising content), or both.

In step 303, the control system 150 detects the consumed viewable attention of the specified recipient with respect to a portion of the time window preceding the receipt time. For example, the control system 150 can detect the consumed viewable attention responsive to receiving the notification. In an embodiment, the control system 150 may keep a respective running tally of the consumed viewable attention for each of a plurality of recipients, and the consumed viewable attention may be detected before the notification is received. In an embodiment, the control system 150 may request viewability information or the consumed viewable attention from the consumption history server 120 or an external viewability system (not shown).

In step 304, the specified recipient's total viewable attention for the time window, including predicted viewable attention for a portion of the time window in the future, is predicted for the time window. In an embodiment, the specified recipient's total viewable attention may be predicted responsive to receiving the notification. In an example, the specified recipient's total viewable attention may not be predicted every time a notification of an opportunity to expose the specified recipient to advertising content is received. For example, if a specified recipient's total viewable attention has been predicted very recently (e.g. within the past minute), the control system may opt to re-use the recently predicted total viewable attention.

In step 305, the control system 150 determines if the proportional exposure cap has been satisfied for the specified recipient. The maximum fraction of the specified recipient's predicted total viewable attention for the time window is compared to the consumed viewable attention of the specified recipient.

In step 306, responsive to the maximum fraction of the specified recipient's predicted total viewable attention for the time window being less than the consumed viewable attention of the specified recipient (i.e. the proportional exposure cap is not satisfied), a response to the notification is generated by the control system 150. In an example, a response to the notification is sent (or caused to be sent) to the specified recipient; the response can comprise advertising content, customized advertising content, instructions for accessing advertising content, instructions for customizing advertising content, instructions for detecting viewability of advertising content, instructions for reporting on viewability of advertising content, or combinations thereof. In an embodiment, the notification can be a bid request from an advertisement exchange 140 and a response to the bid request can be generated by the control system 150 and sent to the advertisement exchange 140. In an embodiment, the consumed viewable attention of the specified recipient can be detected and updated after the response to the notification is sent so that the next time a notification of the availability of another opportunity to expose the specified recipient to advertising content is received by the control system 150, the control system 150 can use the updated consumed viewable attention to rapidly determine an appropriate response.

In step 307, responsive to the maximum fraction of the specified recipient's predicted total viewable attention for the time window being less than or equal to the consumed viewable attention of the specified recipient (i.e. the proportional exposure cap is satisfied), the control system 150 may consider sending advertising content of another advertising campaign to the specified recipient.

Publisher Premium Ad Buy Use Case

In an example embodiment, an advertiser may be interested in adaptively controlling recipient exposure with a proportional exposure cap in conjunction with pre-purchased premium advertising opportunities. Typically a premium advertising inventory comprises a number of opportunities to expose a recipient to advertising content in a known context, such as a specific website or web page. In comparison to advertising opportunities that are auctioned through an exchange, premium inventory can be expensive and is highly valued by advertisers who are particularly sensitive to context. In an embodiment, a control system can receive a campaign configuration comprising a proportional exposure cap. When a recipient visits a publisher (e.g. browses a publisher's webpage) an opportunity for the publisher to serve the recipient may become available (e.g. an opportunity to serve the recipient a banner ad in conjunction with the publisher's webpage). The publisher can send a notification to the control system that an opportunity to expose a specified recipient to advertising content has become available; this opportunity is associated with a pre-purchased ad slot. The control system detects the consumed viewable attention of the specified recipient associated with the advertiser's advertising content with respect to a portion of the time window preceding the receipt time (e.g. the entire time between the start of the time window and the receipt time), which can include consumed viewable attention associated with the advertiser's advertising content delivered in the context of a plurality of publishers. The control system predicts the specified recipient's total viewable attention for the time window, including at least a portion of the time window in the future, which can include viewable attention for advertising content displayed by other publishers and advertising content associated with other advertisers. The control system determines if the proportional exposure cap has been satisfied for the specified recipient by comparing the maximum fraction of the specified recipient's predicted total viewable attention for the time window to the consumed viewable attention of the specified recipient. Responsive to the maximum fraction of the specified recipient's predicted total viewable attention for the time window being greater than the consumed viewable attention of the specified recipient (i.e. the proportional exposure cap has not been satisfied), a response to the notification is sent. A response can comprise advertising content, customized advertising content, instructions for accessing advertising content, instructions for customizing advertising content, instructions for detecting viewability of advertising content, instructions for reporting on viewability of advertising content or combinations thereof. A response can be sent to the publisher, the recipient, or both. After the response has been sent, the consumed viewable attention of the recipient can be detected again, and updated. Furthermore, a recipient's predicted total viewable attention can vary over time, and can be updated after the response has been sent. A recipient's consumed viewable attention, total viewable attention or both may be updated responsive to receiving a second notification of the opportunity to expose the recipient to advertising content or periodically (e.g. every hour, every fourth notification received) or responsive to detecting a recipient's change in activity level (e.g. a recipient's change in web browsing behavior).

Physical Components of a Computer

Figure 4:
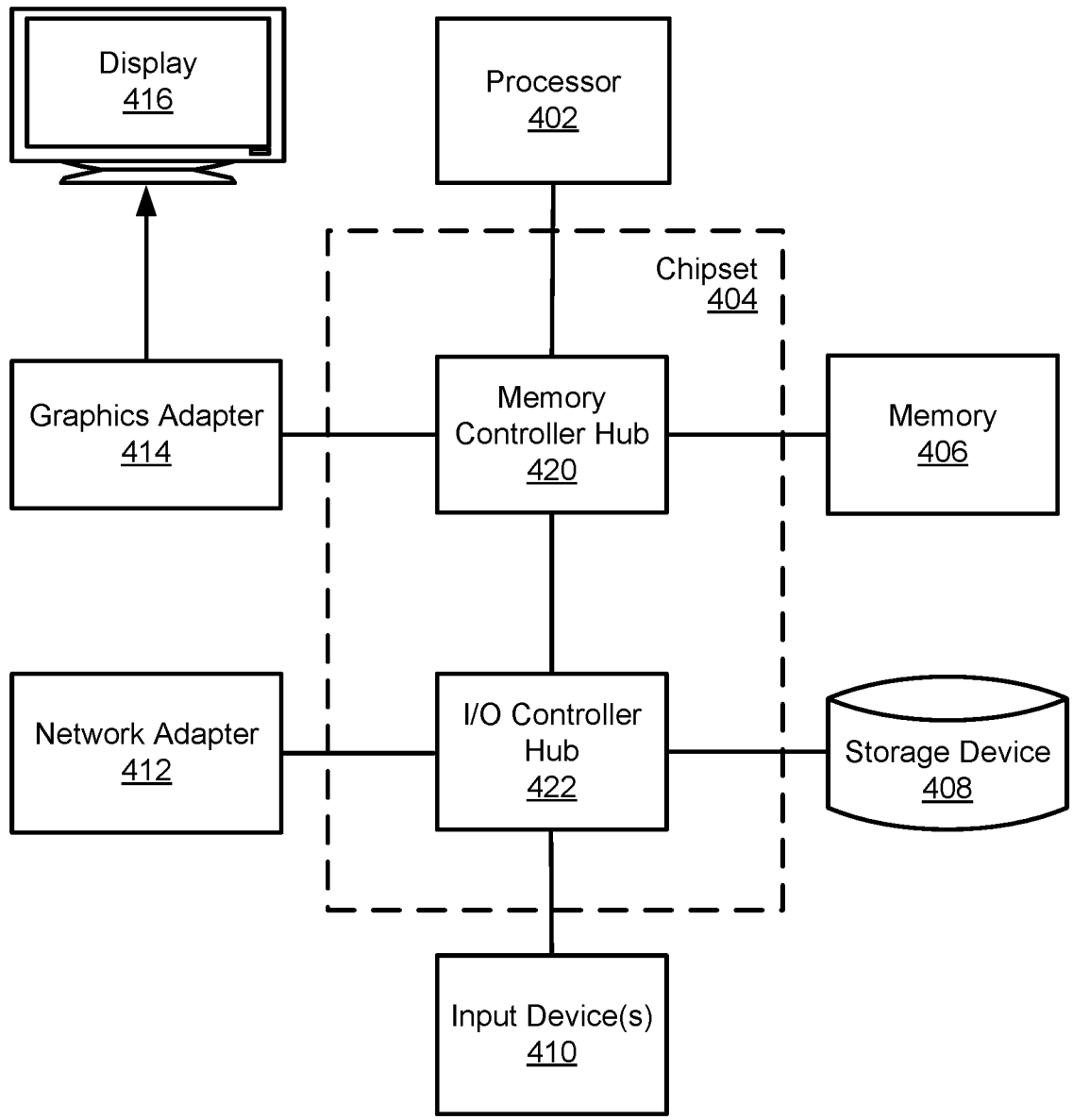
FIG. 4 is a high-level block diagram of the components of a computing system for use, for example, as browser 110, consumption history server 120, publisher 130, advertisement exchange 140, or control system 150 depicted in FIG. 1, in accordance with an embodiment of the invention.

FIG. 4 is a high-level block diagram of the components of a computing system 400 for use, for example, as browser 110, consumption history server 120, publisher 130, advertisement exchange 140, or control system 150, as depicted in FIG. 1, in accordance with an embodiment. Illustrated are at least one processor 402 coupled to a chipset 404. Also coupled to the chipset 404 are a memory 406, a storage device 408, input device(s) 410, a network adapter 412, and a graphics adapter 414. A display 416 is coupled to the graphics adapter 414. In one embodiment, the functionality of the chipset 404 is provided by a memory controller hub 420 and an I/O controller hub 422. In another embodiment, the memory 406 is coupled directly to the processor 402 instead of the chipset 404.

The processor 402 is the hardware logic circuitry of the computer 400 that processes instructions such as computer programs to operate on data. The memory 406 holds instructions and data used by the processor 402. The storage device 408 is any non-transitory computer-readable storage medium, such as a hard drive, compact disk read-only memory (CD-ROM), DVD, or a solid-state memory device. The input devices(s) 410 may be a keyboard, mouse, track ball, touch-sensitive screen and/or another type of pointing device to input data into the computer 400. The network adapter 412 couples the computer 400 to a network. The graphics adapter 414 displays images and other information on the display 416.

As is known in the art, a computer 400 can have different and/or other components than those shown in FIG. 4. In addition, the computer 400 can lack certain illustrated components. In one embodiment, a computer 400 acting as a server may lack an input device 410, a graphics adapter 414, and/or a display 416. Moreover, the storage device 408 can be local and/or remote from the computer 400 (such as embodied within a storage area network (SAN)).

As is known in the art, the computer 400 is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402. The functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times to refer to these arrangements of functional operations as modules, without loss of generality. The described operations and their associated modules may be embodied in software, firmware, hardware, or any combinations thereof.

The disclosed embodiments also relate to an apparatus for performing the operations described herein. This apparatus may be specially constructed for the required purposes, or it may comprise a general-purpose computer selectively activated or reconfigured by a computer program stored on a computer-readable medium that can be accessed by the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in this disclosure may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs of the disclosed embodiments and applications. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the disclosed embodiments without departing from the spirit and scope of the invention as defined in the appended claims.

What is claimed is:

1. A method comprising:
receiving a proportional exposure cap corresponding to a content of an advertising campaign, the proportional exposure cap comprising a fraction;
responsive to receiving, from an advertising platform, at a first receipt time after a beginning of a time window and before an end of the time window, a notification of availability of a first opportunity to expose a recipient to the content:

determining, with respect to a first period of time from the beginning of the time window to the first receipt time, a consumed viewable attention of the content provided to the recipient;

determining a predicted total viewable attention for the time window, the predicted total viewable attention comprising an estimate of all viewable advertising content which will be provided to the recipient in the time window;

determining a proportional predicted total viewable attention by multiplying the predicted total viewable attention by the proportional exposure cap;

determining the difference between the proportional predicted total viewable attention and the consumed viewable attention; and responsive to the proportional predicted total viewable attention being greater than the consumed viewable attention:

sending a first response to the advertising platform comprising instructions to provide the content to the recipient.

2. The method of claim 1 wherein the advertising platform comprises a publisher.

3. The method of claim 1 wherein the advertising platform comprises an advertising exchange.

4. The method of claim 1, wherein the time window corresponds to a duration of the advertising campaign.

5. The method of claim 1, wherein determining the consumed viewable attention comprises:

determining a measure of viewable area and exposure duration of the content provided to the recipient, wherein the consumed viewable attention is based at least in part on the determined measure of viewable area and exposure duration of the content provided to the recipient.

6. The method of claim 1, wherein determining the consumed viewable attention comprises:

determining a measure of interactions by the recipient with the content provided to the recipient, wherein the consumed viewable attention is based at least in part on the determined measure of interactions by the recipient with the content provided to the recipient.

7. The method of claim 1, wherein determining the predicted total viewable attention for the time window comprises:

determining an estimate of viewable area and exposure duration of all viewable advertising content which will be provided to the recipient in the time window, wherein the predicted total viewable attention is based at least in part on the determined estimate of viewable area and exposure duration of all viewable advertising content which will be provided to the recipient in the time window.

8. The method of claim 1, wherein determining the predicted total viewable attention for the time window comprises:

generating a predicted total viewable attention model based on a plurality of media consumption histories corresponding to a plurality of browsers; and applying the predicted total viewable attention model to a media consumption history of the recipient.

9. The method of claim 8, wherein generating the predicted total viewable attention model is based on at least one of a) a list of websites visited by the plurality of browsers, b) a number of websites visited by the plurality of browsers, c) a frequency of visits by the plurality of browsers to the websites visited by the plurality of browsers, d) interactions by the plurality of browsers with the websites visited by the plurality of browsers, e) a website residency time by the plurality of browsers at the websites visited by the plurality of browsers, and f) information related to the plurality of browsers.

10. The method of claim 1, further comprising:

responsive to receiving, from the advertising platform, at a second receipt time after the first receipt time and before the end of the time window, a notification of availability of a second opportunity to expose the recipient to the content:

determining, with respect to a second period of time from the beginning of the time window to the second receipt time, an updated consumed viewable attention of the content provided to the recipient;

determining an updated predicted total viewable attention for the time window, the updated predicted total viewable attention of all viewable content which will be provided to the recipient in the time window;

determining an updated proportional predicted total viewable attention by multiplying the updated predicted total viewable attention by the proportional exposure cap;

determining whether the updated proportional predicted total viewable attention is less than the updated consumed viewable attention; and responsive to determining that the updated proportional predicted total viewable attention is less than the updated consumed viewable attention:

sending a second response to the advertising platform comprising instructions not to provide the content to the recipient.

11. The method of claim 10, wherein the second response to the advertising platform further comprises sending instructions to provide a second content to the recipient.

12. A system comprising:

a processor; and a non-transitory computer-readable storage medium storing processor-executable computer program instructions that, when executed, cause a computer processor to perform a method, the method comprising:

receiving a proportional exposure cap corresponding to a content of an advertising campaign, the proportional exposure cap comprising a fraction;

responsive to receiving, from an advertising platform, at a first receipt time after a beginning of a time window and before an end of the time window, a notification of availability of a first opportunity to expose a recipient to the content:

determining, with respect to a first period of time from the beginning of the time window to the first receipt time, a consumed viewable attention of the content provided to the recipient;

determining a predicted total viewable attention for the time window, the predicted total viewable attention comprising an estimate of all viewable advertising content which will be provided to the recipient in the time window;

determining a proportional predicted total viewable attention by multiplying the predicted total viewable attention by the proportional exposure cap;

determining the difference between the proportional predicted total viewable attention and the consumed viewable attention; and responsive to the proportional predicted total viewable attention being greater than the consumed viewable attention:

sending a first response to the advertising platform comprising instructions to provide the content to the recipient.

13. The system of claim 12, wherein the advertising platform comprises a publisher.

14. The system of claim 12, wherein the advertising platform comprises an advertising exchange.

15. The system of claim 12, wherein the time window corresponds to a duration of the advertising campaign.

16. The system of claim 12, wherein determining the consumed viewable attention comprises:
   determining a measure of viewable area and exposure duration of the content provided to the recipient,
   wherein the consumed viewable attention is based at least in part on the determined measure of viewable area and exposure duration of the content provided to the recipient.

17. The system of claim 12, wherein determining the consumed viewable attention comprises:
   determining a measure of interactions by the recipient with the content provided to the recipient,
   wherein the consumed viewable attention is based at least in part on the determined measure of interactions by the recipient with the content provided to the recipient.

18. The system of claim 12, wherein determining the predicted total viewable attention for the time window comprises:
   determining an estimate of viewable area and exposure duration of all viewable advertising content which will be provided to the recipient in the time window,
   wherein the predicted total viewable attention is based at least in part on the determined estimate of viewable area and exposure duration of all viewable advertising content which will be provided to the recipient in the time window.

19. System of claim 12, wherein determining the predicted total viewable attention for the time window comprises:
   generating a predicted total viewable attention model based on a plurality of media consumption histories corresponding to a plurality of browsers; and
   applying the predicted total viewable attention model to a media consumption history of the recipient.

20. The system of claim 19, wherein generating the predicted total viewable attention model is based on at least one of a) a list of websites visited by the plurality of browsers, b) a number of websites visited by the plurality of browsers, c) a frequency of visits by the plurality of browsers to the websites visited by the plurality of browsers, d) interactions by the plurality of browsers with the websites visited by the plurality of browsers, e) a website residency time by the plurality of browsers at the websites visited by the plurality of browsers, and f) information related to the plurality of browsers.

21. The system of claim 12, wherein the method further comprises:
   responsive to receiving, from the advertising platform, at a second receipt time after the first receipt time and before the end of the time window, a notification of availability of a second opportunity to expose the recipient to the content:
      determining, with respect to a second period of time from the beginning of the time window to the second receipt time, an updated consumed viewable attention of the content provided to the recipient;
      determining an updated predicted total viewable attention for the time window, the updated predicted total viewable attention of all viewable content which will be provided to the recipient in the time window;
      determining an updated proportional predicted total viewable attention by multiplying the updated predicted total viewable attention by the proportional exposure cap;
      determining whether the updated proportional predicted total viewable attention is less than the updated consumed viewable attention; and
      responsive to determining that the updated proportional predicted total viewable attention is less than the updated consumed viewable attention:
         sending a second response to the advertising platform comprising instructions not to provide the content to the recipient.

22. The system of claim 21, wherein the second response to the advertising platform further comprises sending instructions to provide a second content to the recipient.

23. A non-transitory computer-readable storage medium storing processor-executable computer program instructions that, when executed, cause a computer processor to perform a method, the method comprising:
   receiving a proportional exposure cap corresponding to a content of an advertising campaign, the proportional exposure cap comprising a fraction;
   responsive to receiving, from an advertising platform, at a first receipt time after a beginning of a time window and before an end of the time window, a notification of availability of a first opportunity to expose a recipient to the content:
      determining, with respect to a first period of time from the beginning of the time window to the first receipt time, a consumed viewable attention of the content provided to the recipient;
      determining a predicted total viewable attention for the time window, the predicted total viewable attention comprising an estimate of all viewable advertising content which will be provided to the recipient in the time window;
      determining a proportional predicted total viewable attention by multiplying the predicted total viewable attention by the proportional exposure cap;
      determining the difference between the proportional predicted total viewable attention and the consumed viewable attention; and
      responsive to the proportional predicted total viewable attention being greater than the consumed viewable attention:
         sending a first response to the advertising platform comprising instructions to provide the content to the recipient.

24. The medium of claim 23, wherein the advertising platform comprises a publisher.

25. The medium of claim 23, wherein the advertising platform comprises an advertising exchange.

26. The medium of claim 23, wherein the time window corresponds to a duration of the advertising campaign.

27. The medium of claim 23, wherein determining the consumed viewable attention comprises:
   determining a measure of viewable area and exposure duration of the content provided to the recipient,
   wherein the consumed viewable attention is based at least in part on the determined measure of viewable area and exposure duration of the content provided to the recipient.

28. The medium of claim 23, wherein determining the consumed viewable attention comprises:

determining a measure of interactions by the recipient with the content provided to the recipient,
wherein the consumed viewable attention is based at least in part on the determined measure of interactions by the recipient with the content provided to the recipient.

29. The medium of claim 23, wherein determining the predicted total viewable attention for the time window comprises:
determining an estimate of viewable area and exposure duration of all viewable advertising content which will be provided to the recipient in the time window,
wherein the predicted total viewable attention is based at least in part on the determined estimate of viewable area and exposure duration of all viewable advertising content which will be provided to the recipient in the time window.

30. The medium of claim 23, wherein determining the predicted total viewable attention for the time window comprises:
generating a predicted total viewable attention model based on a plurality of media consumption histories corresponding to a plurality of browsers; and
applying the predicted total viewable attention model to a media consumption history of the recipient.

31. The medium of claim 30, wherein generating the predicted total viewable attention model is based on at least one of a) a list of websites visited by the plurality of browsers, b) a number of websites visited by the plurality of browsers, c) a frequency of visits by the plurality of browsers to the websites visited by the plurality of browsers, d) interactions by the plurality of browsers with the websites visited by the plurality of browsers, e) a website residency time by the plurality of browsers at the websites visited by the plurality of browsers, and f) information related to the plurality of browsers.

32. The medium of claim 23, wherein the method further comprises:
responsive to receiving, from the advertising platform, at a second receipt time after the first receipt time and before the end of the time window, a notification of availability of a second opportunity to expose the recipient to the content:
determining, with respect to a second period of time from the beginning of the time window to the second receipt time, an updated consumed viewable attention of the content provided to the recipient;
determining an updated predicted total viewable attention for the time window, the updated predicted total viewable attention of all viewable content which will be provided to the recipient in the time window;
determining an updated proportional predicted total viewable attention by multiplying the updated predicted total viewable attention by the proportional exposure cap;
determining whether the updated proportional predicted total viewable attention is less than the updated consumed viewable attention; and
responsive to determining that the updated proportional predicted total viewable attention is less than the updated consumed viewable attention:
sending a second response to the advertising platform comprising instructions not to provide the content to the recipient.

33. The medium of claim 32, wherein the second response to the advertising platform further comprises sending instructions to provide a second content to the recipient.

* * * * *